United States Patent Office 3,733,210
Patented May 15, 1973

3,733,210
METHOD FOR MAKING LIQUID SHORTENING-CONTAINING CULINARY MIXES
Paul Seiden, Cincinnati, Ohio, assignor to The Procter & Gamble Company, Cincinnati, Ohio
No Drawing. Filed Mar. 24, 1971, Ser. No. 127,765
Int. Cl. A21d 2/00
U.S. Cl. 99—94                                   15 Claims

ABSTRACT OF THE DISCLOSURE

Flour is premixed with emulsifier and the premix which is free of shortening is passed between rollers to smear emulsifier on the flour. The emulsifier-coated flour is added to additional cake mix ingredients, including a liquid shortening, to provide a liquid shortening-containing culinary mix which does not have the usual disadvantages of liquid shortening-containing culinary mixes.

BACKGROUND OF THE INVENTION

Culinary mixes enjoy a wide commercial utilization in the United States, and accordingly, continual efforts to improve the quality of culinary mixes are being made. The present invention relates to culinary mixes used in making baked products, and more specifically, to a method for improving culinary mixes by forming a premix which is especially suitable for use in certain culinary mixes containing liquid shortenings or prepared from liquid shortenings.

Culinary mixes are usually formed from ingredients such as flour, sugar, shortening, flavoring, leavening, and the like, and such mixes are well known in the art. As is well known, such mixes are combined with aqueous liquids such as water plus, in some cases eggs, to make a batter which is then baked.

Traditionally culinary mixes are made utilizing a plastic shortening, as distinguished from a liquid shortening as the shortening ingredient in the culinary mix. Plastic shortenings are made by combining partially hydrogenated oils, often referred to as "basestock," with fully hydrogenated oils, often referred to as "hardstock," and subsequently these oils are treated by a process of mixing, winterizing, crystallizing, and tempering to yield a product which appears solid and plastic in nature and therefore is referred to in the art as a plastic shortening. Plastic shortenings have been utilized nearly exclusively in culinary mixes because plastic shortenings have been found to provide the most desirable culinary mix qualities. These important culinary mix qualities which are usually attributed at least in part to the use of plastic shortenings in the culinary mix are eating quality, texture, and moistness.

In regard to texture as it is utilized herein, the term is intended to include the overall appearance of the baked product, the feel of the baked product, and the cellular structure of the baked product.

Heretofore little use has been made of liquid shortenings in culinary mixes because of the poor texture, moistness, and eating quality obtained. The main problem is that preparing baked products from culinary mixes utilizing liquid shortenings yields a product which has tendencies toward "dipping." Dipping as utilized in the art, with regard to cake mixes, for example, means preparing a cake which rises and then sinks in the middle to give a dipped effect. Other readily apparent deficiencies from utilizing liquid shortenings are that air bubbles in the product tend to coalesce, creating large voids in the product, referred to as "holes" and "tunnels." It therefore is desirable to provide a product which does not have holes and tunnels nor a propensity for dipping. Accordingly, it is an object of this invention to provide a culinary mix product which when utilizing liquid shortenings yields a product of good moistness, eating quality, and texture, and does not provide a product having a large amount of holes and tunnels and dipping.

The method of achieving the above and other objects will become apparent from the following description of the invention.

SUMMARY OF THE INVENTION

This invention relates to a process of forming a culinary mix containing emulsifier-coated flour and liquid shortening. According to the process, a premix of flour and emulsifier which is shortening-free is passed through rollers to smear the emulsifier on the flour. Thereafter emulsifier-coated flour is added to additional cake mix ingredients, including a liquid shortening, to provide a liquid shortening-containing culinary mix of excellent moistness, texture, and eating quality. The resulting baked products even though prepared from liquid shortenings, do not exhibit the disadvantages usually attendant with utilization of liquid shortenings such as dipping and a large amount of holes and tunnels, i.e. poor textural qualities.

DETAILED DESCRIPTION OF THE INVENTION

Traditionally, culinary mixes and, more specifically, cake mixes which are utilized in preparing baked products generally contain the following ingredients within the specified ranges:

| Ingredient: | Percent by weight of dry mix |
|---|---|
| Bleached flour | 20–55 |
| Sugar | 20–70 |
| Shortening | 4–26 |
| Leavening agents | 0–4 |
| Egg solids | 0–5 |
| Hydrophilic colloids | 0–1 |
| Emulsifier | .1–5 |
| Milk solids | 0–5 |
| Cocoa | 0–10 |
| Flavoring (including spices) | 0–10 |

According to the process of this invention, a first step comprises mixing the flour and emulsifier ingredients of the culinary mix. This premix should comprise from 2% to 10% by total weight of emulsifier and preferably from 4% to 6% by total weight of emulsifier. Utilization of amounts of emulsifier within these specified ranges will provide a final emulsifier content of the culinary mix which is within the traditional ranges utilized and which is sufficient to provide the normal functionality of emulsifiers in cake mixes.

It is important to note that the premix should be free of shortening. This is true because in the event that shortening is present in the premix, the shortening will destroy most of the advantages gained by forming a premix which is treated in accord with the process of this invention. More specifically, the process of this invention is designed to more effectively disperse the emulsifier throughout the entire culinary mix so that it has improved functionality. As will be explained in more detail hereinafter, this is accomplished by smearing the emulsifier over the flour particles to provide emulsifier-coated flour. However, in the event that any shortening is present in the premix which is subsequently roll milled, the shortening will act as a solvent for the emulsifier and consequently remove the emulsifier from the flour particles from the flour particles leaving uncoated flour. Therefore, shortening present in the premix will destroy the advantages gained by forming the premix which is subsequently treated by the process of this invention.

There are certain exceptions to the general principle that shortening will provide a solvent which destroys the effect of forming a premix, such as when the emulsifier utilized is a non-oil-soluble emulsifier, and when the emulsifier is a high melting point emulsifier. However, non-oil-soluble or at least partially non-oil-soluble emulsifiers and high melting point emulsifiers have not heretofore been utilized with liquid shortenings primarily because these two classes of emulsifiers have been found to be not as functional in culinary mixes as other oil soluble and lower melting point emulsifiers. In this regard another advantage of the invention is that it has particular utility in providing enhanced functionality in culinary mixes for oil-insoluble emulsifiers or at least partially oil-insoluble emulsifiers, and higher melting point emulsifiers.

Typical emulsifiers which can be utilized in forming the initial premix are readily available. Representative of such compounds and classes of emulsifiers are mono- and diglycerides of fat-forming fatty acids, e.g. monostearin and dipalmitin; polyoxyalkylene ethers of fatty esters of polyhydric alcohol, such as polyoxyethylene ethers of fatty esters of polyhydric alcohol, such as polyoxyethylene ethers of sorbitan monostearate or the polyoxyethylene ethers of sorbitan di- or tristearate; mono- and diesters of glycol and fatty acids such as propylene glycol monostearate; and partial esters of carboxylic acids such as lactic, citric, and tartaric acids with the mono- and diglycerides of fatty acids such as glyceryl lactyl palmitate; and half esters of propylene glycol monoesters and dicarboxylic acids, such as stearoyl propylene glycol hydrogen succinate; and acylated monoglycerides. The fatty acids used to prepare the above emulsifiers include those derived from beef tallow, lard, and castor, coconut, cottonseed, mustard seed, palm, peanut, rapeseed, crambe, rice bran, soybean, marine oils, and the like.

Especially preferred emulsifiers for utilization in the process of this invention because the process has particular utility in making these emulsifiers functional in culinary mixes are oil-insoluble or partially oil-insoluble emulsifiers such as polyglycerol esters, for example, polyglycerol mono- and diesters, vegetable or animal lecithin, and monoglycerides such as monobehenate and fatty acids such as behenic acid, and, high melting point emulsifiers such as polyglycerol esters, monobehenate, hydrogenated lecithin, behenyl propylene glycol hydrogen succinate, and the like.

Additional preferred emulsifiers for utilization in forming the premix because of their special suitability for use in culinary mixes containing liquid shortenings comprise mixtures of propylene glycol monoesters, and in some instances other emulsifiers. These especially preferred emulsifier mixtures are the following:

(1)

|  | Percent |
| --- | --- |
| Rapeseed oil hardstock propylene glycol monoesters | 15 |
| Palm oil hardstock propylene glycol monoesters | 77 |
| Behenic acid | 8 |

(2)

| Crambe oil hardstock propylene glycol monoesters | 40 |
| --- | --- |
| Propylene glycol monostearate | 40 |
| Behenic acid | 10 |
| Crambe oil hardstock mono- and diglycerides | 10 |

(3)

| Crambe oil hardstock propylene glycol monoesters | 20 |
| --- | --- |
| Propylene glycol monostearate | 35 |
| Decaglycerol tribehenate | 30 |
| Crambe oil hardstock monoglyceride | 5 |
| Behenic acid | 10 |

The premix is preferably formed from either finely divided emulsifier or melted emulsifier. It has been found that when either finely divided emulsifier which can be prepared in conventional size reducing apparatuses, or melted emulsifier is utilized, that the result is an emulsifier which is more effectively dispersed throughout the entire premix.

After the formation of the premix the premix is then passed between the rollers of a roll mill to smear the emulsifier onto the flour and provide emulsifier-coated flour particles.

Roller mills are well known devices utilized for applying crushing and shearing forces to ingredients for use in culinary mixes. For a description of roll mills and their operations, see Perry's Chemical Engineering Handbook, 3d Edition, page 1074 and other related disclosures therein. A particular effective roll milling apparatus is a roller mill comprising three to four rolls in which adjacent rollers revolve at different speeds. Very satisfactory results can be obtained when the ratio of roll speeds of adjacent rolls range from 2:1 to about 5:1. The premix can be treated by a single pass between the rollers or by several passes. However, a large number of passes between the rollers will not provide any more efficient smearing of the emulsifier upon the flour than will from 2 to 4 passes.

A convenient measure of milling conditions is by work input to the premix. Although the optimum value will be set by the efficiency of the equipment and by the exact components of the premix, a total work input of from 5 to 70 watt hours per pound will provide a satisfactory emulsifier-coated and/or smeared, the two terms being used interchangeably herein, ingredient. Preferably the work input should range from 10 to 40 watt hours per pound.

The precise temperature and pressure to be employed when utilizing rollers to smear the emulsifier on the flour will vary for different emulsifiers, but is generally within the range of from 40° F. to 180° F., and a pressure of from 100 p.s.i.g. to 600 p.s.i.g. It has been found that when these temperature and pressure conditions are utilized, the best result in terms of smearing the emulsifier on the flour to give a dispersion over the entire flour mass, are obtained. Particularly preferred results have been obtained where the roll temperature is from 80° F. to 140° F. and where the pressure is from 200 p.s.i.g. to 500 p.s.i.g.

While the above description of the process of passing the premix between rollers to smear the emulsifier on the flour is described with reference to utilizing the total amount of flour in the premix and in the rolling operation, it is possible to divide the flour into a first portion which is utilized in the premix and is smeared with the total weight of emulsifier and thereafter combine that first portion with the remaining portion of the flour and subject the total mix to a uniform mixing operation. It has been found that where this method is employed the first portion of flour is preferably at least one-fourth of the total flour content. This procedure is desirable when process efficiency is desired to be obtained by limiting the portion of flour which must be passed through the roller mill. Surprisingly, as long as at least one-fourth of the flour is passed along with the emulsifier through the roller mill, the efficiency of that emulsifier-coated flour in terms of providing mixes which are suitable for use in liquid shortening-containing culinary mixes is nearly as great as when the total amount of flour is passed through the rollers.

The final step of the process of this invention includes adding the emulsifier-coated flour to additional culinary mix ingredients including a liquid shortening to provide a liquid shortening-containing culinary mix capable of providing excellent moistness, texture, and eating quality.

The additional ingredients other than the liquid shortening are those ingredients traditionally utilized in preparing culinary mixes and as briefly heretofore mentioned, can constitute sugar, flavoring, leavening, milk solids, corn syrup solids, salt, vanilla, colorants, and the like. In regard to the liquid shortening ingredient, any available liquid shortening can be utilized, including those conventionally sold on the market and those normally referred to as salad oils. All of these liquid shortening or oil ingredients are characterized by being high in mono- or polyunsaturates and generally contain little, if any, emulsifiers. The invention is particularly useful where the liquid shortening contains little or no emulsifiers, for example, in those oils traditionally characterized as salad oils, because for the first time when utilizing this process, these oils can be made functional for use in culinary mixes with a sacrifice in moistness, texture, and eating quality.

It is particularly surprising that liquid shortenings can be made to provide cake mixes of excellent texture, i.e. a substantial absence of dipping and holes and tunnels, because batters prepared from culinary mixes containing liquid shortenings have a higher batter density than when plastic shortenings are utilized. In particular, where the same emulsifier system is utilized in the premix-roller milling operation of this invention and in a plastic shortening, the batter density of the batters prepared from the culinary mixes of this invention will range from about .8 to 1.0 gram/cc., whereas when the plastic shortening is utilized the batter density will range from about .6 to about .8 gram/cc. Normally it is expected that an increase in batter density will give bad baked products in terms of eating quality, texture and moistness; however, this has been found not to be true in the event that the process of this invention is utilized.

In terms of the final culinary mix products of this invention, one convenient method of including the liquid shortening in that culinary mix product is to provide a separate liquid shortening pouch within a larger package containing the dry ingredients. At the time of use the consumer merely opens the liquid shortening pouch and pours that ingredient into the other culinary mix ingredients.

Of course, optimum procedures for incorporating the emulsifier-coated shortening-free premix as well as the liquid shortening into the total culinary mix composition will vary depending upon the precise mix being made. However, one particular satisfactory method in connection with making cake mixes is to place the emulsifier-coated premix along with all ingredients other than the liquid shortening into an Entoleter to remove any remaining lumps and to provide thorough mixing, and finally passing that mixture through a size reducing device such as an impact mill and then packaging those ingredients as above explained. Various alternate procedures for this packaging process will be readily apparent to those skilled in the art and therefore will not be described herein.

If desired, an additional step can be adding the sugar to the emulsifier-coated flour and co-milling the sugar and flour in accord with the process disclosed in U.S. Pats. 3,508,929 and 3,508,928, both issued Apr. 28, 1970 to Callaghan et al. and Ewing et al., respectively.

Additionally, if desired, an alternative embodiment provides forming the premix from sugar and emulsifier as opposed to flour and emulsifier in which case the sugar becomes emulsifier-coated and the flour can be added in subsequent processing steps. In this instance results are substantially equal to the embodiment utilizing flour in the premix. However, it is preferred that flour be utilized because slightly better performance in culinary mixes having liquid shortenings therein is found to exist.

The following examples are offered to illustrate the process of this invention.

EXAMPLE 1

A yellow cake mix was prepared from the following ingredients:

| Ingredients: | Percent by weight |
|---|---|
| Flour—cake | 35.45 |
| Sugar—granular | 37.89 |
| Shortening—liquid | 16.00 |
| Leavening | 1.85 |
| Nonfat milk solids | 3.89 |
| Gums and modified starches | 2.15 |
| Emulsifier* | 1.59 |
| Salt | .88 |
| Vanilla | .20 |
| Colorant | .10 |

*The emulsifier component comprised 4.5% by weight of total amount of flour and emulsifier (i.e. the premix) and was 5% behenic acid, 18% rapeseed hardstock propylene glycol mono- and diesters, and 77% propylene glycol mono- and distearate.

A premix was prepared by combining the flour and the emulsifier. Subsequent to combining the emulsifier with the flour the emulsifier was melted by utilization of a steam bath. After adding the emulsifier and flour together they were mixed in a Hobart mixer at speed #1 until a relatively homogeneous mixture was obtained. Thereafter the premix comprising melted emulsifier and flour was fed through a four-roll mill to smear the emulsifier on the flour. The bottom two rolls of the mill were operating at a pressure of 200 p.s.i.g. and the top roll was operating at a pressure of 600 p.s.i.g. The middle two rolls had no external pressure applied to them. The rolls were operating at a temperature of 175° F. with respect to the bottom roll, 150° F. with respect to the second roll, and about 40° F. with respect to the top two rolls. The premix was passed twice through the four-roll mill and then passed through an Entoleter to remove lumps from the mix. The emulsifier-smeared and/or coated flour was then added to the additional cake mix ingredients specified above, including the liquid shortening. The total mixture was blended in a ribbon blender and thereafter 511 grams of the above mix was combined with 300 ml. of water and two eggs to form a homogeneous batter having a batter density of .83 gram/cc. Thereafter 450 grams of the batter was placed in an 8-inch round pan and baked at 350° F. for 40 minutes. The resulting cake was examined and was found to be excellent in terms of moistness, eating quality, and texture. No abnormal amount of holes and tunnels or dipping was noticed, indicating that the product was substantially equal in texture and eating quality to a control cake prepared in a conventional manner not utilizing emulsifier-coated flour but utilizing a plastic shortening.

Substantially similar results are obtained when a white cake of the following formulation is prepared: 190 grams flour, 85 grams of liquid oil shortening, 266 grams granulated sugar, 5 grams salt, 14 grams leavening, 5 grams vanilla, and 10 grams of an emulsifier system comprising 20% crambe oil hardstock propylene glycol monoesters, 35% propylene glycol monostearate, 30% decaglycerol tribehenate, 5% crambe oil mono- and diglycerides, and 10% behenic acid. The cake is prepared by adding the above ingredients to four egg whites and 260 grams of milk to form a batter which is baked as in Example 1.

Results similar to those shown in Example 1 are obtained when the emulsifier system is (1) 15% rapeseed oil hardstock propylene glycol monoesters, 77% palm oil hardstock propylene glycol monoesters, and 8% behenic acid; (2) 40% crambe oil hardstock propylene glycol monoesters, 40% propylene glycol monostearate, 10% behenic acid, and 10% crambe oil hardstock mono- and diglycerides; or (3) 20% crambe oil hardstock propylene glycol monoesters, 35% propylene glycol monostearate, 30% decaglycerol tribehenate, 5% crambe oil hardstock monoglyceride, and 10% behenic acid, when the cake formulation is a chocolate cake and when the emulsifier is coated on the sugar ingredient to form an emulsifier-coated sugar premix.

Substantially similar results are obtained when a one-fourth portion of the flour is utilized in the premix and is smeared with the total weight of emulsifier and thereafter the remaining portion of the flour is added to the emulsifier-smeared portion and mixed therewith in a ribbon blender.

What is claimed is:

1. The process of forming a culinary mix containing emulsifier-coated flour and liquid shortening, said process comprising: premixing flour with melted emulsifier, said emulsifier containing from 2% to 10% by weight of the premix, said premix being free of shortening; passing said premix between heated rollers with a roller pressure sufficient to smear said emulsifier on said flour; adding said emulsifier-coated flour to additional cake mix ingredients including a liquid shortening to provide a liquid shortening-containing culinary mix capable of providing baked products of excellent moistness, texture, and eating quality.

2. A process of forming a culinary mix containing emulsifier-coated flour and a liquid shortening, said process comprising: premixing flour with emulsifier, said emulsifier comprising from 2% to 10% by weight of the premix, said premix being free of shortening; passing said premix between rollers to smear said emulsifier on said flour, said rollers operating at a temperature of from 40° F. to 180° F. and a pressure of from 100 p.s.i.g. to 600 p.s.i.g.; adding said emulsifier-coated flour to additional cake mix ingredients including a liquid shortening to provide a liquid shortening-containing culinary mix capable of providing baked products of excellent moistness, texture, and eating quality.

3. The process of claim 2 wherein the premix comprises flour and finally divided solid emulsifier.

4. The process of claim 2 wherein the premix comprises flour and melted emulsifier.

5. The process of claim 2 wherein the liquid shortening is substantially emulsifier-free.

6. The process of claim 2 wherein a first portion of flour is utilized in the premix and is smeared with the total weight of emulsifier and thereatfer the remaining portion of the flour is added.

7. The process of claim 2 wherein the roll temperature is from 80° F. to 140° F.

8. The process of claim 2 wherein the roll pressure is from 200 p.s.i.g. to 500 p.s.i.g.

9. The process of claim 2 wherein the premix comprises from 4% to 6% emulsifier.

10. The process of claim 2 wherein the emulsifier is a high melting point emulsifier.

11. The process of claim 2 wherein the emulsifier is at least partially oil insoluble.

12. The process of claim 2 wherein the emulsifier comprises a mixture of propylene glycol monoesters.

13. The process of claim 12 wherein the emulsifier comprises 15% rapeseed propylene glycol monoesters, 77% palm oil propylene glycol monoester, and 8% behenic acid.

14. The process of claim 12 wherein the emulsifier comprises 40% crambe oil propylene glycol monoesters, 40% propylene glycol monostearate, 10% behenic acid, and 10% crambe oil hardstock mono- and diglycerides.

15. The process of claim 12 wherein the emulsifier comprises 20% crambe oil propylene glycol monoesters, 35% propylene glycol monostearate, 30% decaglycerol tribehenate, 5% crambe oil monoglyceride and 10% behenic acid.

References Cited

UNITED STATES PATENTS

| 3,582,355 | 6/1971 | Hunt | 99—94 |
| 3,071,472 | 1/1963 | Hager et al. | 99—94 |

RAYMOND N. JONES, Primary Examiner